United States Patent
Cavage et al.

(10) Patent No.: US 7,386,848 B2
(45) Date of Patent: Jun. 10, 2008

(54) METHOD AND SYSTEM TO ALLEVIATE DENIAL-OF-SERVICE CONDITIONS ON A SERVER

(75) Inventors: Mark Joseph Cavage, Cedar Park, TX (US); Kristin M. Hazlewood, Austin, TX (US); Richard Allyn Heller, Austin, TX (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 10/677,659

(22) Filed: Oct. 2, 2003

(65) Prior Publication Data

US 2005/0076335 A1    Apr. 7, 2005

(51) Int. Cl.
*G06F 9/46* (2006.01)
(52) U.S. Cl. .................. 718/102; 718/100; 718/101
(58) Field of Classification Search ............. 718/103, 718/106
See application file for complete search history.

(56) References Cited

U.S. PATENT DOCUMENTS 6,018,759 A * 1/2000 Doing et al. ............... 718/108
7,051,330 B1 * 5/2006 Kaler et al. ................ 718/106
2001/0056456 A1 * 12/2001 Cota-Robles .............. 709/103
2004/0031035 A1 * 2/2004 Shiu et al. ................. 718/102

OTHER PUBLICATIONS

Deng et al. Scheduling Real-Time Applications in an Open Environment, Dec. 2-5, 1997, Reasl-Time Systems Symposium, 1997. Proceedings., The 18th IEEE, 308-319.*

* cited by examiner

*Primary Examiner*—Lewis A Bullock
*Assistant Examiner*—Eric C Wai
(74) *Attorney, Agent, or Firm*—Duke W. Yee; Jeffrey S. LaBaw; Gerald H. Glanzman

(57) ABSTRACT

A method is presented for processing data in a multithreaded application to alleviate impaired or substandard performance conditions. Work items that are pending processing by the multithreaded application are placed into a data structure. The work items are processed by a plurality of threads within the multithreaded application in accordance with a first algorithm, e.g., first-in first-out (FIFO). A thread within the multithreaded application is configured apart from the plurality of threads such that it processes work items in accordance with a second algorithm that differs from the first algorithm, thereby avoiding the impairing condition. For example, the thread may process a pending work item only if it has a particular characteristic. The thread restricts its own processing of work items by intermittently evaluating workflow conditions for the plurality of threads; if the workflow conditions improve or are unimpaired, then the thread does not process any work items.

3 Claims, 8 Drawing Sheets

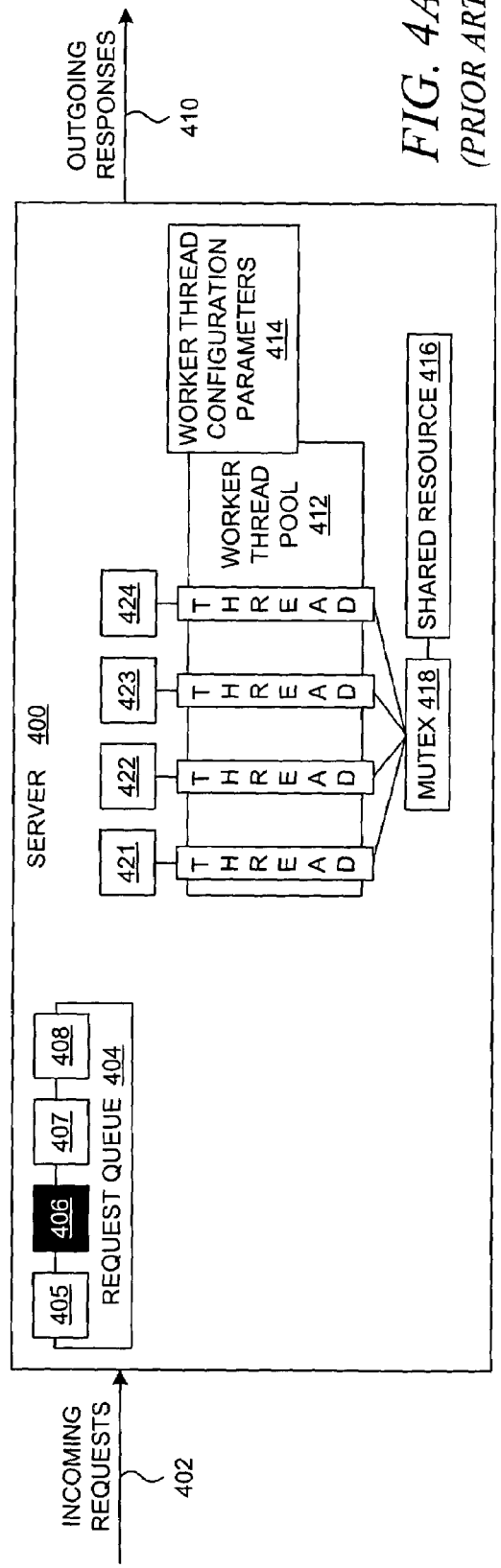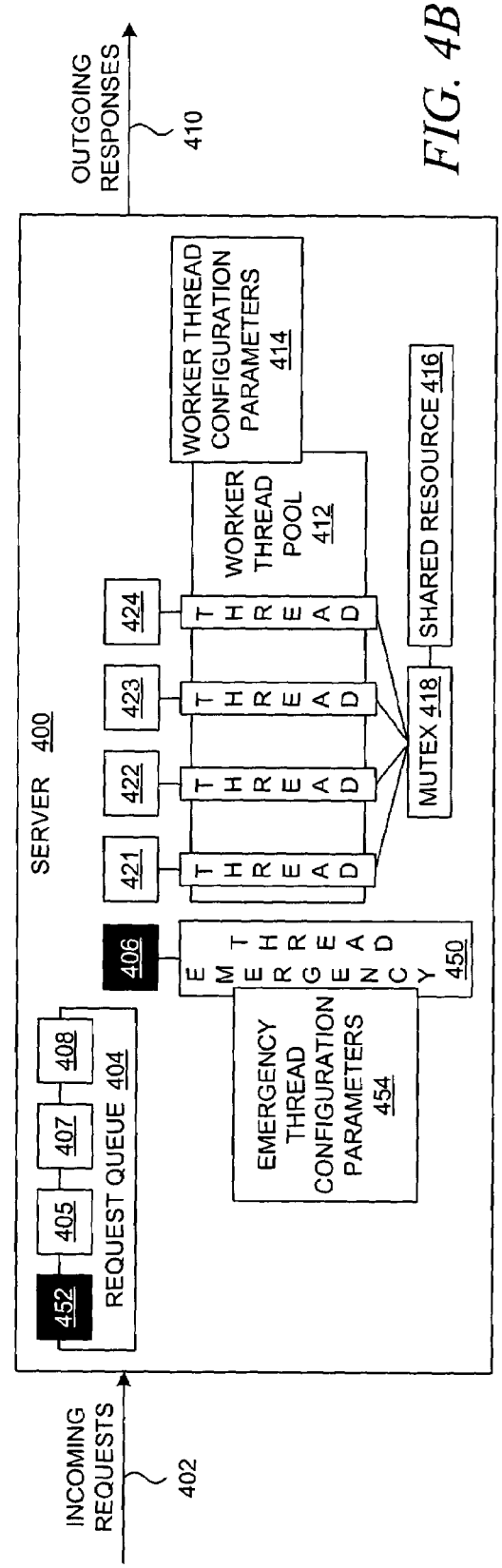

METHOD AND SYSTEM TO ALLEVIATE DENIAL-OF-SERVICE CONDITIONS ON A SERVER

BACKGROUND OF THE INVENTION

1. Field of the Invention

The present invention relates to an improved data processing system and, in particular, to a method and apparatus for multiple process coordinating. Still more particularly, the present invention provides a method and apparatus for process scheduling.

2. Description of Related Art

Modern operating systems support multiprogramming, whereby multiple programs appear to execute concurrently on a single computational device with a single central processing unit (CPU) or possibly multiple CPUs in a symmetric multiprocessor (SMP) machine. The appearance of concurrent execution is achieved through the use of serialized execution, also known as "time slicing": the operating system of a device allows one of the multiple programs to execute exclusively for some limited period of time, i.e., a time slice, which is then followed by a period of time for the exclusive execution of a different one of the multiple programs. Because the switching between programs occurs so quickly, it appears that the programs are executing concurrently even though they are actually executing serially. When the time slice for one program is concluded, that program is put into a suspended or "sleep" state, and another program "awakes" and begins to execute.

One way of improving the performance of a single program or a single process is to divide the program or the process into paths of execution, often termed "threads", that appear to execute concurrently. Such a program or process is typically described as "multitasking" or "multithreaded"; the operating system provides each thread with a time slice during which it has exclusive use of the CPU. Operating systems typically provide built-in mechanisms for switching between concurrent programs and/or threads in a very quick and efficient manner; some types of CPUs provide direct hardware support to an operating system for multithreading.

As threads execute, they invariably need to access resources within a data processing system, such as memory, data structures, files, or other resources. Resources that are intended to be shared by multiple threads must be shared in such a way to protect the integrity of the data that is contained within the resource or that passes through the resource; one way of effecting this is by means of serializing execution of threads that are competing for a shared resource. When a first thread is already using a resource, a second thread that requires the resource must wait until the resource is no longer being used, which would typically occur as a consequence of the first thread having successfully completed its use of the resource. Hence, an operating system allocates time slices to threads in accordance with their needs and their competition for resources rather than through the use of strictly periodic time slices.

In some situations, threads that are competing for shared resources may begin to require more time per work unit because the threads spend more time waiting for other threads to finish using a shared resource that is required to complete the processing of a work unit. On a server, for example, threads may respond more slowly to incoming requests as they wait for a resource that is required to respond to those incoming requests. In the worst situations, the threads may become deadlocked on a shared resource, in which case the threads may completely stop responding to incoming requests.

During these types of situations, there may be some actions that a system administrator can take to help alleviate the situation. For example, the system administrator could dynamically reconfigure a system in a certain manner by entering commands through a system administration tool or utility. Due to the software architecture of the data processing system, though, an action by the system administrator may be placed into a queue behind many other previously pending work units. Hence, the alleviating action of the system administrator is delayed because the threads are slowly processing the work units. In the case in which the threads have become deadlocked, the alleviating action of the system administrator becomes trapped in the queue; since the threads are no longer removing and processing work units from the queue, the alleviating action of the system administrator is never processed.

A particularly serious scenario in which a server's threads may become deadlocked is a denial-of-service attack, which are increasingly more common. The connectivity of the Internet provides malicious users with the ability to probe data processing systems and to launch attacks against computer networks around the world. Many computer security tools are commercially available that provide defensive mechanisms for limiting the ability of malicious users to cause harm to a computer system. An intrusion detection system can alert an administrator to suspicious activity so that the administrator can take actions to track the suspicious activity and to modify systems and networks to prevent security breaches. These intrusion detection systems typically only gather information about possible security incidents, and a system administrator must manually take certain actions to protect networks and resources from the malicious user during an intrusion or attack.

When a server experiences a denial-of-service attack, a large number of requests are directed at the server in a short period of time, e.g., requests for web pages from a web server, and the larger number of pending requests overwhelm the server because the requests are received much faster than they can be answered by the worker threads on the server. Depending on various factors, the server may crash, or the server may continue to respond to incoming requests, albeit in a seemingly much slower manner, because all of the server's worker threads are already busy with pending requests. In some cases, the threads may become deadlocked on a shared resource.

During a denial-of-service attack, there may be some actions that a system administrator can take to help alleviate the situation. For example, the system administrator could configure the server to stop servicing requests from particular clients as identified at particular addresses or to refuse certain authentication credentials. However, many data processing systems have a distributed architecture, and the system administration tools communicate with servers using the same request and response mechanism as is used by the denial-of-service attack. Hence, an action by the system administrator through an administrative application may generate a request to the server, and the system administrator's request is processed in the same manner as the requests from the denial-of-service attack. In that case, the system administrator's request may be placed into the same queue as previously pending requests, and the system administrator's request becomes trapped in the queue, either severely delaying the processing of the system administrator's request or, in the case of deadlocked threads, ensuring that system administrator's request is never processed.

Therefore, it would be advantageous to have a technique for alleviating denial-of-service conditions in a server. It would be particularly advantageous to alleviate these conditions in a manner such that the processing architecture can be extended to provide for the solution without disrupting the basic processing architecture.

SUMMARY OF THE INVENTION

A method is presented for processing data in a multithreaded application to alleviate impaired or substandard performance conditions. Work items that are pending processing by the multithreaded application are placed into a data structure. The work items are processed by a plurality of threads within the multithreaded application in accordance with a first algorithm, e.g., first-in first-out (FIFO). A thread within the multithreaded application is configured apart from the plurality of threads such that it processes work items in accordance with a second algorithm that differs from the first algorithm, thereby avoiding the impairing condition. For example, the thread may process a pending work item only if it has a particular characteristic. The thread restricts its own processing of work items by intermittently evaluating workflow conditions for the plurality of threads; if the workflow conditions improve or are unimpaired, then the thread does not process any work items.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 4A depicts a block diagram that illustrates a typical organization of software elements in a multithreaded application that is processing requests in a reactor-type processing pattern;

FIG. 4B depicts a block diagram that illustrates a multithreaded application that is processing requests in a reactor-type processing pattern in conjunction with an emergency thread in accordance with an embodiment of the present invention;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
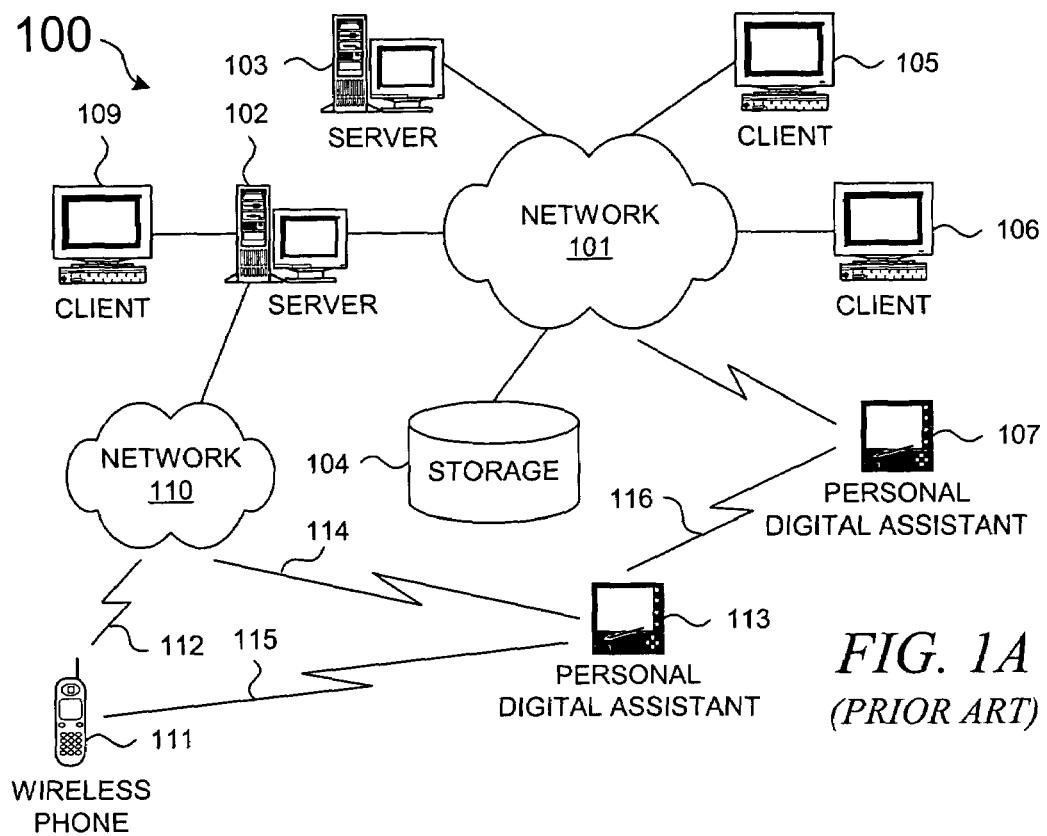
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
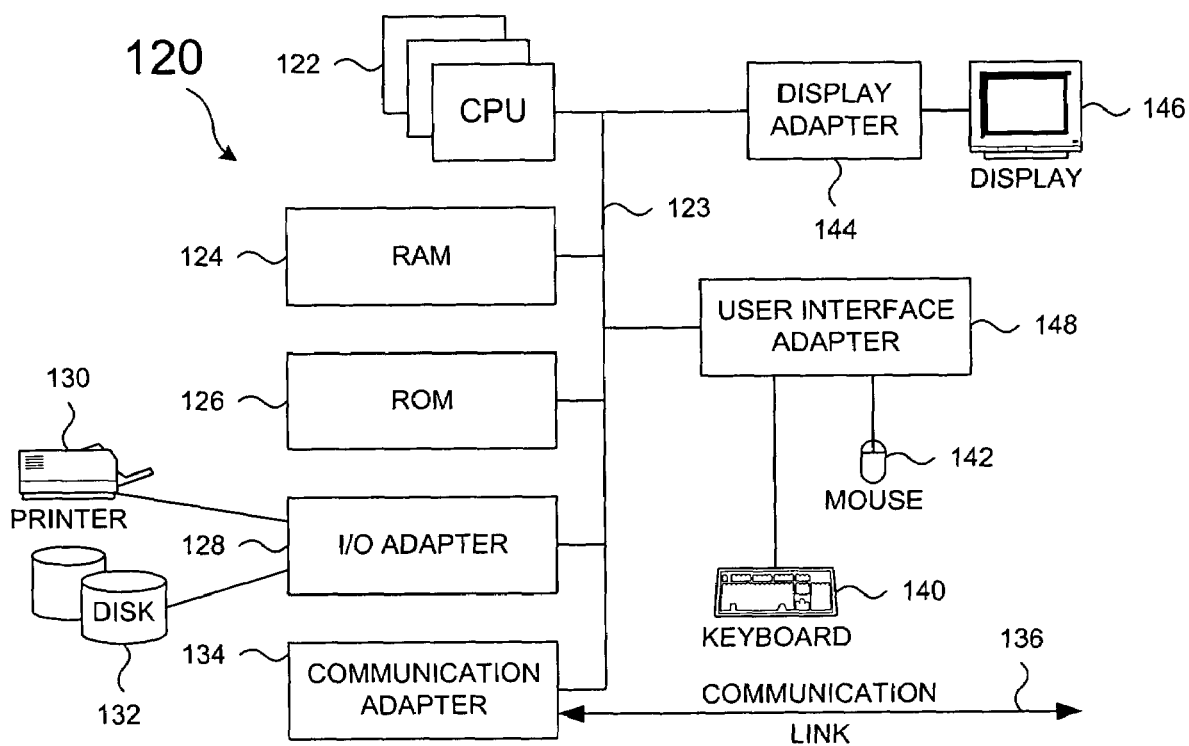
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B, including a symmetric multiprocessor (SMP) machine. Although all of the components that are shown within FIG. 1A and FIG. 1B are not required by the present invention, these elements may be used by a component in which the present invention is embedded, e.g., an operating system, an application, or some other component. In addition, the present invention may be implemented in a computational environment in which various components, such as display devices, are used indirectly to support the present invention, e.g., to allow configuration of parameters and elements by a system administrator.

More specifically, though, the present invention is directed to an improved request processing architecture, which may be implemented within an operating system, within an application, or in some other manner within a data processing system. Prior to describing the improved process in more detail, the use of a typical reactor pattern of processing is illustrated. FIGS. 2A-4A are used as illustrations of background information; these figures show that multiple threads may employ a mutex as a useful mechanism for ensuring serial access to a shared resource. If a shared resource becomes a processing bottleneck, many threads may be waiting on its associated mutex, and the threads may appear to stop performing useful work.

Figure 2A:
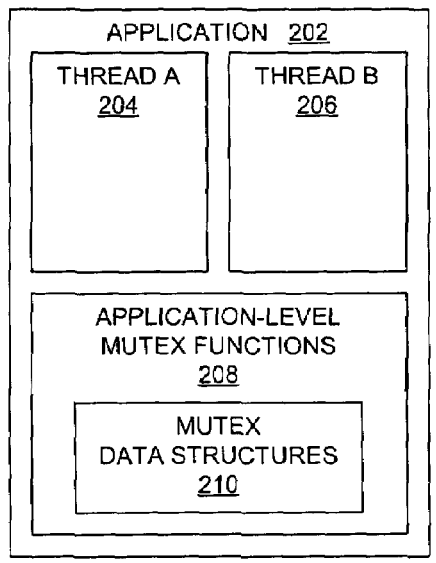
FIG. 2A depicts a block diagram that shows a logical organization of components within a typical multithreaded application that employs mutexes.

With reference now to FIG. 2A, a block diagram depicts a logical organization of components within a typical multithreaded application that employs mutexes. Multithreaded application 202 comprises multiple threads, such as thread 204 and thread 206. Rather than relying on mutex functions that might be provided by an operating system or within a standardized software library, such as the POSIX™ "pthread" library, an application may implement its own mutex functions 208, which are supported by mutex data structures 210, in order to serialize the operations of its own threads with respect to a resource that is shared by the threads that comprise the application.

Figure 2B:
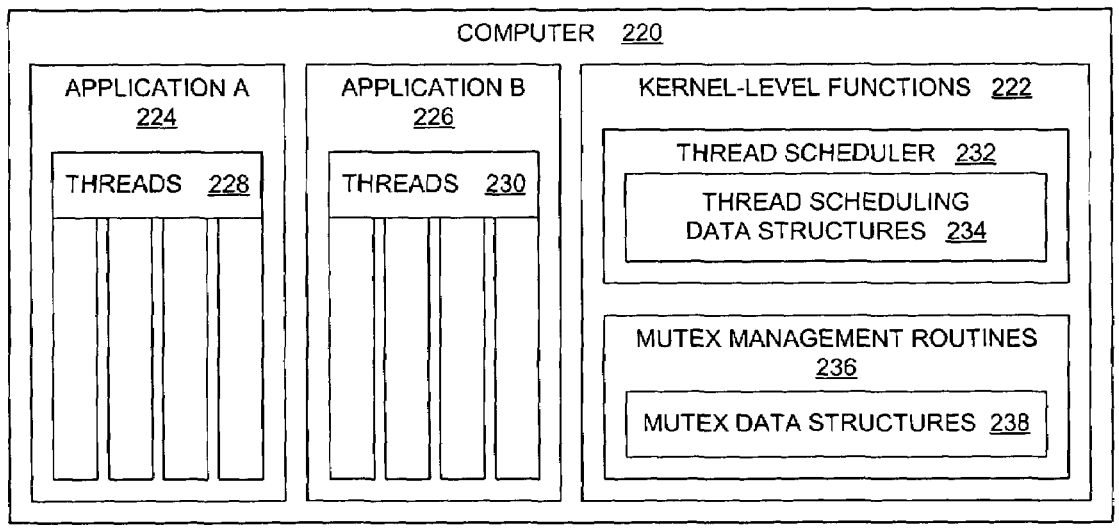
FIG. 2B depicts a block diagram that shows a logical organization of components in a typical data processing system that supports the execution of multithreaded applications that use mutexes that are supported by an operating system kernel.

With reference now to FIG. 2B, a block diagram depicts a logical organization of components on a typical data processing system that supports the execution of multithreaded applications that use mutexes that are supported by an operating system kernel. Computer 220 supports an operating system which contains kernel-level functions 222, which control the execution of multithreaded applications 224 and 226, which comprise threads 228 and 230, respectively. Thread scheduler 232 within the kernel determines when a thread runs and when it is suspended using thread scheduler data structures 234, which may contain data structures for assisting in the management of thread scheduling tasks; for example, the data structures may include FIFO (first-in, first-out) queues, such as queues that are associated with various thread states, e.g., a ready-to-execute queue, a sleeping queue, an I/O blocked queue, a mutex-waiting queue, or other states. Mutex management routines 236 that reside within the kernel (or routines as kernel extensions that execute with kernel-level privileges) provide functionality for creating, modifying, and destroying mutexes as reflected within mutex data structures 238.

Figure 3:
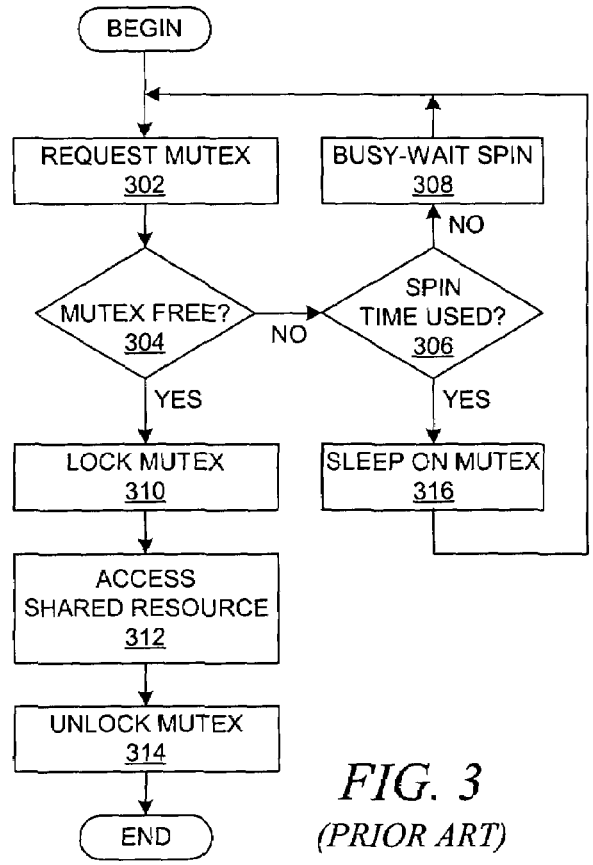
FIG. 3 depicts a typical implementation of a spin lock mutex.

With reference now to FIG. 3, a typical implementation of a spin lock mutex is depicted. The process begins when a thread requests to acquire a mutex (step 302). A determination is made as to whether the mutex is free and unlocked (step 304), and if not, then a check is made as to whether a configurable amount time has been used by the thread by spinning on the mutex (step 306). If not, then the thread performs a busy-wait loop (step 308), i.e., it spins in a loop, as it waits for the mutex to become available; if the thread has already been through steps 302-308 previously, then the thread continues to perform the spinning operation by completing another busy-wait loop. After spinning for some period of time, the thread then repeats step 302.

If the mutex is free at step 304, then the mutex is locked on behalf of the thread (step 310), and the thread may proceed to access a shared resource (step 312) without the possibility of colliding with another thread and compromising the integrity of the data that is associated with the shared resource. After the thread has performed its operations with respect to the shared resource, then the thread requests that the mutex should be released, and the mutex is unlocked (step 314), thereby concluding the process. After the mutex has been unlocked, the mutex can be used by other concurrently executing threads. If a configurable amount time has already been used by the thread by spinning on the mutex as determined at step 306, then the thread sleeps on the mutex (step 316), e.g., by calling a kernel function that causes the thread to be put into a sleep state. The thread may sleep for a configurable period of time, or the kernel may have the ability to wake the thread when the mutex has been unlocked. In any case, after the thread is awakened, the thread again attempts to acquire the mutex.

As mentioned above, if a shared resource becomes a processing bottleneck, many threads may be waiting on a mutex that is associated with the shared resource, and the threads may appear to stop performing useful work while they are waiting to acquire the mutex. The present invention, though, may be used in conjunction with a variety of other software mechanisms that may be associated with shared resources, e.g., semaphores. Although these software mechanisms help to illustrate a processing bottleneck, they are not required by the present invention.

With reference now to FIG. 4A, a block diagram illustrates a typical organization of software elements in a multithreaded application that is processing requests in a reactor-type processing pattern. Many typical servers are based on a design in which one or more threads queue client requests for subsequent processing by worker threads. In the example that is shown in FIG. 4A, server 400 may be a multithreaded server application, or server 400 may support a multithread application. Incoming client requests 402 are placed into request queue 404, which is holding pending requests 405-408. After the incoming requests are processed, outgoing responses 410 are sent to the requesting clients.

Multiple worker threads are organized in worker thread pool 412. The worker threads may perform their duties in accordance with worker thread configuration parameters 414. These worker threads retrieve a request from request queue 404, process the retrieved request, and then generate a response for that particular request. During the course of processing a request, a worker thread may need to access shared resource 416, which may be guarded by mutex 418. In FIG. 4A, the worker threads are illustrated as holding requests 421-424 that are currently being processed by the worker threads. While all of the worker threads are attempting to access a shared resource while processing requests 421-424, no additional requests are removed from request queue 404.

The need to access shared resource 416 may create a an apparent denial-of-service condition or a real denial-of-service condition; hereinbelow, these conditions are grouped into a class of conditions which may be described as an impaired workflow condition. In certain situations, the multithreaded application may enter an impaired workflow condition in which the application appears to hang, e.g., as perceived by a system administrator. In other situations, an impaired workflow conditions may display other abnormal behaviors.

As noted above, during an impaired workflow condition, there may be some actions that a system administrator can take to help to alleviate or to resolve an impaired workflow condition. Referring again to FIG. 4A, request queue 404 contains multiple requests, including pending request 406, which is differently illustrated to indicate that it is a request that has a special characteristic that is not present in the other pending requests. For example, the special characteristic may be a source network address that identifies the source of the request as a system administrator. As another example, the special characteristic may be a special authentication credential that is associated with, bound to, or attached to the request in some manner, whereby the authentication credential identifies the request as originating from a user with certain privileges, such as a system administrator.

Pending request 406 may be a system administrative request that could alleviate or resolve an impaired workflow condition that is currently afflicting server 400. In the example of FIG. 4A, though, all of the worker threads are already busy with requests 421-424, and pending request 406 may not be processed for a relatively long period of time; if the multithreaded application is already in a hung condition, pending request 406 may never be processed.

Turning now to the present invention, the present invention is directed to a process for alleviating or resolving an impaired workflow condition in a multithreaded application; in particular, the present invention is useful for alleviating or resolving an impaired workflow condition in a multithreaded application that appears to have stopped performing useful work or that has actually stopped performing useful work, e.g., during a severe denial-of-service attack. The remaining figures illustrate various embodiments of the present invention.

With reference now to FIG. 4B, a block diagram illustrates a multithreaded application that is processing requests in a reactor-type processing pattern in conjunction with an emergency thread in accordance with an embodiment of the present invention. FIG. 4B is similar to FIG. 4A in that both figures illustrate a reactor-type processing pattern using a pool of worker threads that process incoming requests and generate outgoing responses; similar reference numerals in FIG. 4A and FIG. 4B refer to similar elements.

FIG. 4B differs from FIG. 4A in that server 400 also supports emergency thread 450, which is a thread that exists primarily to service incoming requests when the worker threads are too busy to do so, e.g., in an impaired workflow condition. In some embodiments, an emergency thread may perform additional processing, or the functionality of the emergency thread, as described hereinbelow, may be incorporated into other types of threads.

The present invention is particularly useful in attempting to alleviate or to resolve an impaired workflow condition by processing administrative actions that are available to be processed by the multithreaded application yet that would not be processed at all or for a relatively long period of time if left to the worker threads. In the example that is shown in FIG. 4B, emergency thread 450 has been able to retrieve pending request 406 from request queue 404. After pending request 406 is processed by emergency thread 450, the impaired workflow condition may be alleviated or resolved in some manner such that the worker threads are able to continue processing other pending requests.

In addition, the removal of pending request 406 has enabled an additional administrative request, pending request 452, to be added to request queue 402. In a manner similar to pending request 406, pending request 452 is differently illustrated to indicate that it is a request that has a special characteristic that is not present in most of the other pending requests. Hence, in some situations, the emergency thread's actions allow additional administrative requests to be received and processed.

Emergency thread 450 performs its processing duties in accordance with emergency thread configuration parameters 454, which are used to configure the manner in which the emergency thread performs its processing operations, which is distinct from the manner in which the worker threads perform their processing operations. In other words, the emergency thread processes requests in accordance with a particular algorithm, and the worker threads process requests in accordance with a different algorithm. The significance of these parameters is described in more detail further below with respect to the remaining figures.

Thread 450 is termed an "emergency" thread in reference to its ability to alleviate or to resolve scenarios in which an application has entered an impaired workflow condition, thereby requiring an emergency-like reaction with respect to the life cycle of the application. The term "emergency thread" may be used merely to distinguish thread 450 from the worker threads, which may be instances of a thread class that are otherwise substantially identical to each other. The emergency thread preferably runs in the same process space as the worker threads, thereby allowing the emergency thread to access data structures that are also used by the worker threads without causing any memory protection violations.

FIG. 4B and the remaining figures illustrate examples in which the present invention processes requests in order to generate responses. As the requests are pending, the requests are stored in a first-in, first-out (FIFO) queue. When a worker thread is ready to process another pending request, it removes the pending requests from the request queue. It should be noted, however, that these examples may be generalized such that the present invention processes generic work items that have been stored in a generic data structure. These work items may be data items that represent useful work that is expected to be performed by the multithreaded application, and the source of the work items may be any entity that is able to communicate the need for the work items to the multithreaded application. The work items may be communicated as messages across a network, or the need for the work items may be communicated or derived in some other manner. The present invention may employ any appropriate data structure that is able to be implemented on a computer readable medium for storing the work items. Moreover, the threads may process a pending request without removing the pending request from the data structure; for example, a worker thread may merely indicate within a data structure that a particular work item is already being processed such that another worker thread does not attempt to process that particular work item.

In the exemplary embodiment of the present invention that is presented within the remaining figures, the emergency thread exists primarily to service incoming requests when the worker threads are too busy to do so, e.g., in an impaired workflow condition, and in particular, to service incoming administrative requests that may alleviate or resolve the impaired workflow condition. The emergency thread preferably sleeps while not processing pending requests; the emergency thread wakes up periodically, e.g., every few seconds, to determine if the multithreaded application is experiencing an impaired workflow condition. If the multithreaded application is not experiencing an impaired workflow condition, then the emergency thread reenters a sleep state. It should be noted, however, that in an alternative embodiment, the emergency thread may not enter a sleep state and may perform some other operations, e.g., remaining in a loop while watching for an impaired workflow condition; however, the use of a sleep state gives the emergency thread a lightweight characteristic with respect to the consumption of computational resources.

If the multithreaded application is experiencing an impaired workflow condition, then the emergency thread walks the request queue that is holding the pending requests while examining the pending requests for certain characteristics, e.g., administrative requests or requests that are known not to require a shared resource upon which the worker threads may be waiting. If the emergency thread finds a particular request that it determines that it should handle, then the emergency thread processes that particular request; otherwise, the examined requests remain unmodified such that the worker threads would eventually process these examined requests.

As the emergency thread is executing, the emergency thread reevaluates the current workflow conditions and determines whether or not to continue its attempt to process pending requests. In a preferred embodiment, the emergency thread performs this reevaluation after each pending request that it processes, e.g., after each pending request that it removes from the input request queue and for which it subsequently generates a response. In an alternative embodiment, if the examination of a pending request requires a significant amount of time, then the emergency thread might perform the reevaluation after each examination of a pending request. If the emergency thread determines during a reevaluation operation that the workflow conditions are not impaired, then the emergency thread reenters a sleep state to watch for a subsequent impaired workflow condition.

Figure 5:
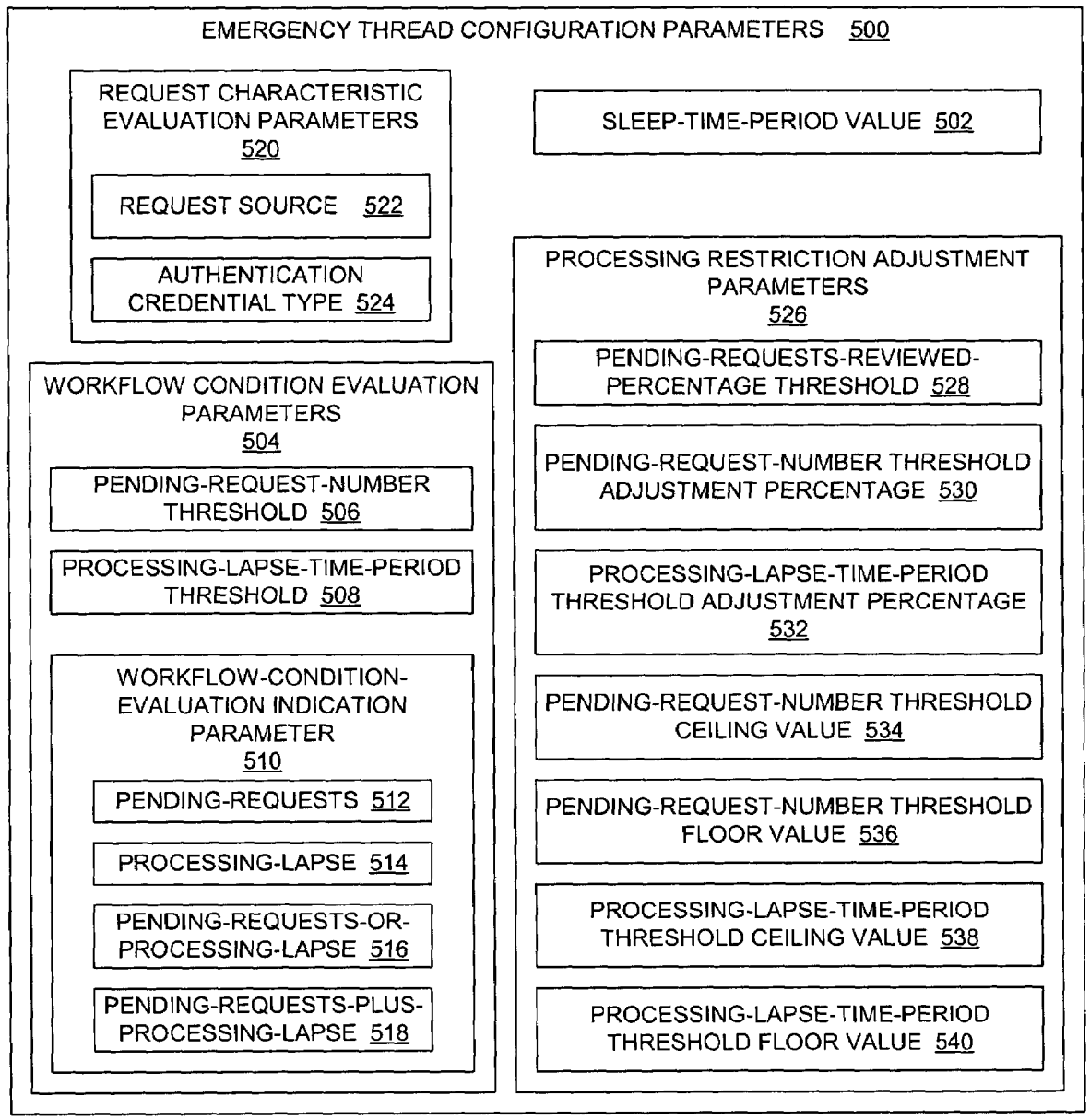
FIG. 5 depicts a block diagram that illustrates a set of parameters that may be used to configure the processing algorithm of an emergency thread in accordance with an embodiment of the present invention.

With reference now to FIG. 5, a block diagram depicts a set of parameters that may be used to configure the processing algorithm of an emergency thread in accordance with an embodiment of the present invention. Hence, it should be noted that some embodiments of the present invention may not require a set of one or more configuration parameters.

Preferably, emergency thread configuration parameters 500 are retrieved in some manner from persistent storage, e.g., from a configuration file or properties file, possibly in a dynamically updated fashion; alternatively, the parameters may be retrieved or stored in some other manner, including by being hard-coded within the emergency thread. The parameters or the sets of parameters may be stored together or separately.

Sleep-time-period value 502 indicates the length of the time period that the emergency thread should spend in a sleep state before repeating an evaluation of the workflow conditions.

Workflow condition evaluation parameters 504 contain values that are used to evaluate workflow conditions by the emergency thread at a particular point in time. In the examples that are shown in the figures, a determination of an impaired workflow condition is based on an excessive number of pending requests and/or an excessive time period during which the worker threads fail to process a pending request. For example, if the emergency thread determines that the number of requests that are pending processing by the worker threads exceeds pending-request-number threshold value 506, then the emergency thread may determine that the multithreaded application is in an impaired workflow condition or state. Likewise, if the emergency thread determines that a relatively lengthy time period has elapsed during which the worker threads have not processed a pending request, and this time period exceeds processing-lapse-time-period threshold value 508, then the emergency thread may determine that the multithreaded application is in an impaired workflow condition or state.

Additionally, another parameter may be used to control the information upon which the determination of an impaired workflow condition is based. Workflow-condition-evaluation indication parameter 510 indicates which particular workflow condition or conditions should be examined by the emergency thread; the example shows four possible values that may be used. Pending-requests value 512 indicates that an excessive number of pending requests should be used to determine whether an impaired workflow condition exists. Processing-lapse value 514 indicates that an excessive time period since the most recently processed request should be used to determine whether an impaired workflow condition exists. Pending-requests-or-processing-lapse value 516 indicates that either an excessive number of pending requests or an excessive time period since the most recently processed request should be used to determine whether an impaired workflow condition exists. Pending-requests-plus-processing-lapse value 518 indicates that both an excessive number of pending requests and an excessive time period since the most recently processed request should be used to determine whether an impaired workflow condition exists.

If the emergency thread determines that an impaired workflow condition exists, then the emergency thread examines the pending requests to check whether any of the pending requests can be processed by the emergency thread, particularly in an attempt to alleviate or resolve the impaired workflow condition. Request characteristic evaluation parameters 520 provide information about the characteristics of pending requests that should be used by the emergency thread to evaluate whether the emergency thread can process a given pending request. For example, the emergency thread can compare request source value 522 against the source of a pending request; if the values match, then the emergency thread would process the pending request, e.g., by generating a response for the request. In another example, the emergency thread can compare authentication credential type value 524 against the authentication credential that is associated with a pending request; if the values match, then the emergency thread would process the pending request.

In some cases, as explained in more detail further below, the emergency thread may determine that the workflow condition evaluation parameters may need to be adjusted. By adjusting the workflow condition evaluation parameters, the emergency thread can attempt to regulate when the emergency thread discovers that the multithreaded application has entered into an impaired workflow condition, which restricts or controls when the emergency thread tries to alleviate or to resolve an impaired workflow condition. Hence, the emergency thread can engage in a type of self-regulating operation via an adjustment of the workflow condition evaluation parameters.

Processing restriction adjustment parameters 526 are values that are used in this self-regulating operation. However, the emergency thread only performs this self-regulating operation under certain conditions, which may vary in accordance with an implementation of the present invention. In the exemplary embodiment that is shown in the figures, the emergency thread performs the adjustment based on the percentage of the number of pending requests that it has examined or reviewed since its most recent awakening and based on whether it has processed any pending requests. In an alternative embodiment, the emergency thread performs the adjustment based on whether it has found an impaired workflow condition and based on the percentage of the number of pending requests that it has processed, e.g., by removing the pending requests from a request queue.

In the exemplary embodiment herein, if the emergency thread determines that it has processed at least one pending request, then the emergency thread either raises or lowers both pending-request-number threshold value 506 and processing-lapse-time-period threshold value 508. If the emergency thread determines that the percentage of the number of pending requests that it has examined or reviewed since its most recent awakening has not exceeded pending-requests-reviewed percentage threshold 528, then the impaired workflow condition has improved relatively quickly, and the emergency thread does not need to evaluate workflow conditions as often as the parameters currently allow. Hence, the emergency thread increases pending-request-number threshold value 506 by the percentage amount indicated by pending-request-number threshold adjustment percentage 530 and increases processing-lapse-time-period threshold value 508 by the percentage amount indicated by processing-lapse-time-period threshold adjustment percentage 532.

If the emergency thread determines that the percentage of the number of pending requests that it has examined or reviewed since its most recent awakening has exceeded pending-requests-reviewed percentage threshold 528, then the impaired workflow condition has not improved quickly in relation to the time period during which the emergency thread was able to review a relatively large number of pending requests, and the emergency thread needs to evaluate workflow conditions more often than the parameters currently allow. Hence, the emergency thread reduces pending-request-number threshold value 506 by the percentage amount indicated by pending-request-number threshold adjustment percentage 530 and reduces processing-lapse-time-period threshold value 508 by the percentage amount indicated by processing-lapse-time-period threshold adjustment percentage 532.

If the emergency thread adjusts pending-request-number threshold value 506 and processing-lapse-time-period threshold value 508, some parameters values may be used to control the limits to which they may be adjusted. Pending-request-number threshold ceiling value 534 and pending-request-number threshold floor value 536 provide maximum and minimum limits, respectively, for pending-request-number threshold value 506. Processing-lapse-time-period threshold ceiling value 538 and processing-lapse-time-period threshold floor value 540 provide maximum and minimum limits, respectively, for processing-lapse-time-period threshold value 508.

Figure 6:
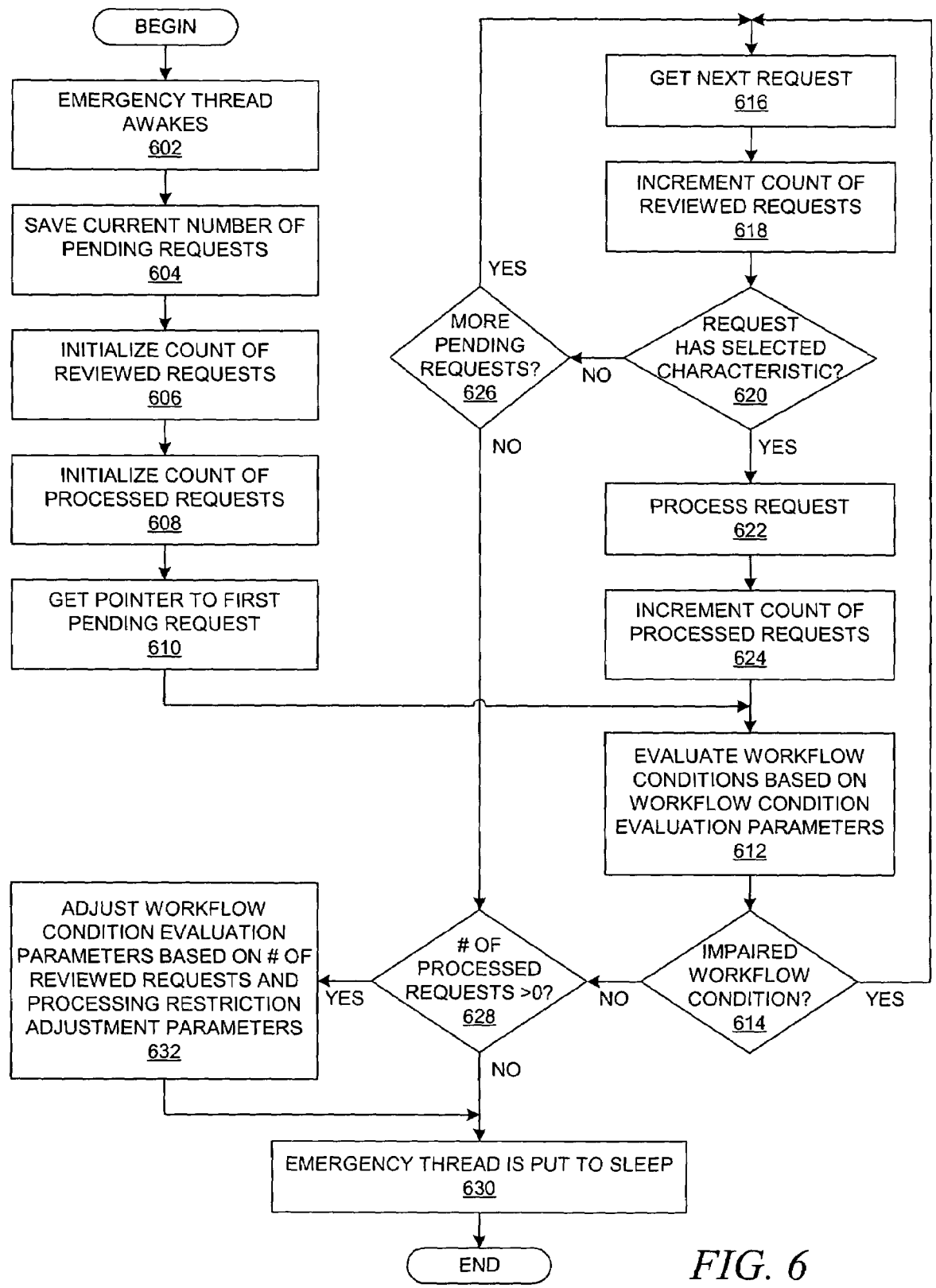
FIG. 6 depicts a flowchart that illustrates a process through which an emergency thread evaluates workflow conditions within a multithreaded application, examines pending requests for potential processing, and possibly adjusts workflow condition evaluation parameters in accordance with an embodiment of the present invention.

With reference now to FIG. 6, a flowchart depicts a process through which an emergency thread evaluates workflow conditions within a multithreaded application, examines pending requests for potential processing, and possibly adjusts workflow condition evaluation parameters in accordance with an embodiment of the present invention. The process commences when an emergency thread within a multithreaded application awakes (step 602). It may be assumed that a set of worker threads within the multithreaded application are in some state of execution; the worker threads may be executing concurrently, or the worker threads may be waiting to access a shared resource.

The emergency thread may enter a sleep state between the periods during which it evaluates workflow conditions. The manner in which the emergency thread sleeps and awakes may vary in different implementations of the present invention. For example, the emergency thread may request the setting of a software timer through a system call, and upon expiration of the software timer, the emergency thread enters a runnable state; a thread dispatcher eventually dispatches the emergency thread for execution. With respect to the present invention, the intermittent or periodic execution periods of the emergency thread can be contrasted with the substantially continuous execution of the worker threads, although the worker threads may become stalled on shared resources, etc.

The emergency thread then performs some initialization operations to prepare for subsequent actions. The emergency thread saves the current number of pending requests (step 604). The emergency thread initializes a count value for the number of requests that have been reviewed or examined by the emergency thread to zero (step 606). The emergency thread also initializes a count value for the number of requests that have been processed by the emergency thread to zero (step 608). In addition, the emergency thread obtains a pointer to the first pending request (step 610) or otherwise determines which of the pending requests is the first request that should be examined for potential processing.

The emergency thread then evaluates the current workflow conditions in accordance with a set of one or more workflow condition evaluation parameters (step 612), such as workflow condition evaluation parameters 504 that are shown in FIG. 5; step 612 is illustrated in more detail with respect to FIGS. 7A-7B further below. A determination is made as to whether or not an impaired workflow condition has been determined to exist (step 614). If so, then the emergency thread begins to examine the pending requests to see if the emergency thread should process any of the pending requests.

The emergency thread obtains the next pending request (step 616) and increments the count of the reviewed requests (step 618). A determination is made as to whether or not the next pending request has a selected characteristic (step 620), e.g., as selected by one or more configurable parameters, such as request characteristic evaluation parameters 520 that are shown in FIG. 5. If so, then the emergency thread processes the next pending request (step 622), e.g., by generating an outgoing response for the request, after which it increments the count of the processed requests (step 624).

Throughout the figures, the emergency thread processes a pending request in any appropriate manner, including the generation of an outgoing response in a manner that might be similar to the work that is accomplished by the worker threads. The fact that the emergency thread is able to process typical pending requests that are not seen by the worker threads may eliminate an impaired workflow condition.

It should be noted, however, the emergency thread may process pending requests in a manner that is substantially different from the worker threads, particularly given that the emergency thread may be configured through request characteristic evaluation parameters 520 to select particularly important pending requests. In addition, in some embodiments of the present invention, the emergency thread may be able to process certain pending requests that should not or cannot be processed by the worker threads because these requests have been particularly generated by a system administration utility for the emergency thread.

Furthermore, the operations that are performed by the emergency thread when it processes a pending request may relate to the configuration of the worker threads within the multithreaded application. As noted in FIG. 4B, the multithreaded application may comprise worker thread configuration parameters 414. One or more of these parameters may instruct the worker threads to use shared resource 416, which might be only one of a set of shared resources that are available to the multithreaded application. Hence, in one exemplary scenario, a system administrator may determine the identity of a shared resource, i.e. shared resource 416, that is the cause of the impaired workflow condition, possibly as a result of receiving a response to a request that was directed to the emergency thread. In this scenario, the system administrator may select an operation that results in a special request for the emergency thread; when the emergency thread processes this special request, the emergency thread might change worker thread configuration parameters 414 to direct the worker threads thereafter to a different shared resource, presumably a shared resource that will not cause an impaired workflow condition. In this manner, the emergency thread may be able to dynamically reconfigure the worker threads to alleviate or resolve the impaired workflow condition based on the identity of the shared resource.

Referring again to FIG. 6, the emergency thread then reevaluates the workflow conditions at step 612, and another determination is made as to whether or not an impaired workflow condition has been determined to exist at step 614. In some cases, the impaired workflow condition may have been alleviated or resolved by a pending request that the emergency thread has processed, or the impaired workflow condition may have been alleviated or resolved by a pending request that has been processed by one of the concurrently executing worker threads.

If an impaired workflow condition is determined to still exist at step 614, then the emergency thread loops back to step 616 to examine another pending request. If it is determined that the next pending request does not have a selected characteristic at step 620, then a determination is made as to whether or not any more pending requests remain unexamined or unreviewed (step 626). If so, then the emergency thread loops back to step 616 to examine another pending request. If there are no pending requests that remain unexamined or unreviewed, then the process branches to step 628.

Step 628 may also be reached through step 614. If an impaired workflow condition is determined not to exist at step 614, then a determination is made as to whether or not the count of the number of processed requests, i.e. processed by the emergency thread, is greater than zero (step 628). If the number of processed requests is not greater than zero, then the emergency thread has not processed any pending requests (other than to examine the pending requests), and the emergency thread is put to sleep (step 630), and the process is concluded.

If the number of processed requests is greater than zero at step 628, then the workflow condition evaluation parameters are adjusted based on the number of reviewed requests and the processing restriction adjustment parameters (step 632); step 632 is illustrated in more detail with respect to FIG. 8 further below. The emergency thread is then put to sleep at step 630, and the process is concluded.

As noted above, the adjustment of the workflow condition evaluation parameters provides a self-regulating mechanism on the emergency thread. The emergency thread may have reached step 632 because it has reviewed all of the pending requests while having processed at least one of the requests. However, the emergency thread may have reached step 632 because the impaired workflow condition has been eliminated, at least temporarily, after the emergency thread has processed at least one of the requests. Since the emergency thread is executing concurrently with the worker threads, it is possible that one or more of the worker threads has not entered a hung condition, even though it may appear that this is the case to a system administrator, and the actions of a worker thread may have eliminated the apparent hung condition.

Given that the emergency thread is executing concurrently with the worker threads, i.e. essentially in parallel with the worker threads, the present invention attempts to allow the worker threads to continue their processing as much as possible. Thus, when the emergency thread reevaluates the workflow conditions and determines that the impaired workflow condition has been alleviated or resolved, then the emergency thread pauses its execution by returning to a sleep state in order to allow the worker threads to continue their processing actions.

Since the worker threads are supposed to be processing requests in parallel with the emergency thread, the amount of effort that the emergency thread has expended is examined. At step 632, the extent to which the emergency thread has executed since its most recent awakening is computed based on the percentage of the number of pending requests that it has examined or reviewed since its most recent awakening and based on whether it has processed any pending requests, at least within the exemplary embodiment that is shown in the figures. If the emergency thread is expending a relatively large amount of effort before an impaired workflow condition is alleviated or resolved, then the emergency thread determines that it should be running more often in order to help alleviate or resolve an impaired workflow condition that continues to occur. FIG. 8 shows more detail for the manner in which the emergency thread may adjust various parameters to regulate the frequency at which the emergency thread is executing.

Figure 7A:
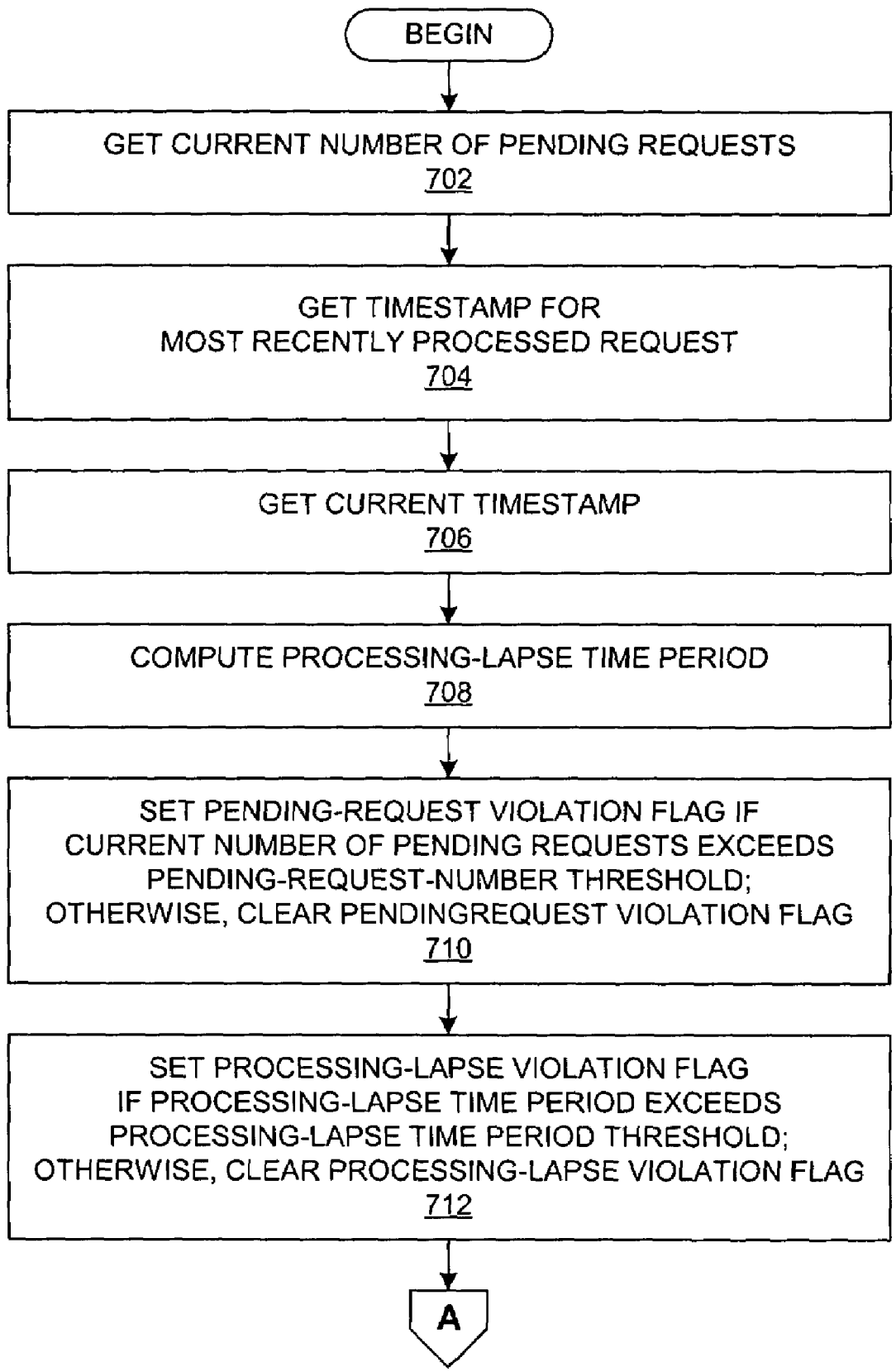
FIGS. 7A-7B depict a pair of flowcharts that illustrates a process for evaluating workflow conditions within a multithreaded application in order to determine whether an impaired workflow condition exists.
Figure 7B:
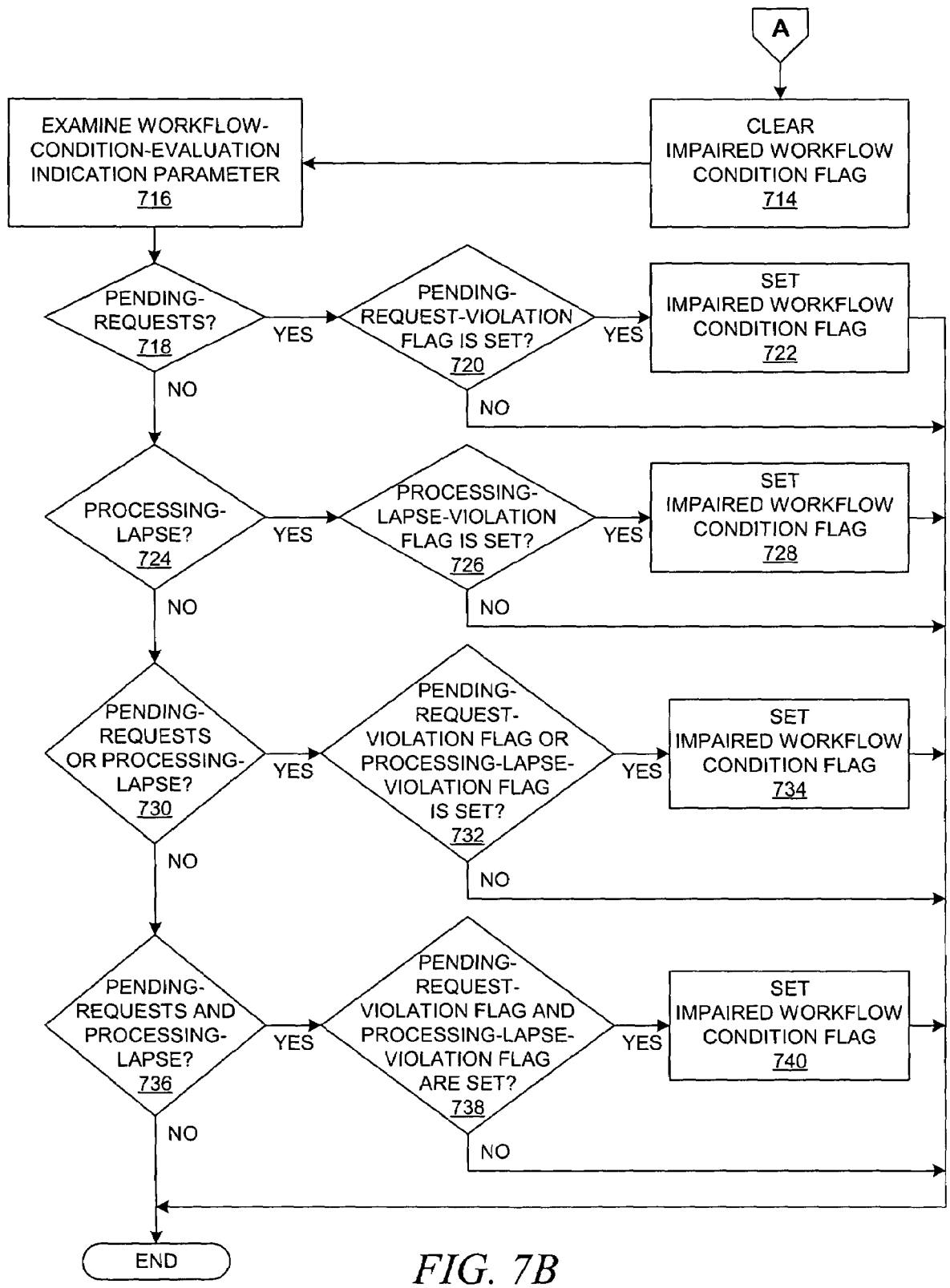

With reference now to FIGS. 7A-7B, a pair of flowcharts depicts a process for evaluating workflow conditions within a multithreaded application in order to determine whether an impaired workflow condition exists. The process that is shown within FIGS. 7A-7B provides additional detail for step 612 in FIG. 6; the process results in a flag value that indicates whether or not an impaired workflow condition exists, and the flag value may be employed at step 614 in FIG. 6.

Referring now to FIG. 7A, the process commences with the emergency thread obtaining a current count of the number of pending requests (step 702); this count value may be stored within a data structure, e.g., an input request queue, or the emergency thread may be required to determine the number of pending requests in some manner.

The emergency thread also obtains a previously stored timestamp that indicates the completion time of the most recently processed request (step 704). It may be assumed that after completing the processing of a pending request, each worker thread stores a timestamp value within a data structure to indicate its completion time, which might be determined by a system call to obtain a timestamp. The emergency thread then obtains a current timestamp (step 706) and computes a difference between the current timestamp and the previous timestamp (step 708). The computed difference represents a processing-lapse time period, which is the amount of time that has elapsed since the completion of the most recently processed request.

The emergency thread then compares the current number of pending requests with the pending-request-number threshold value and sets or clears a pending-request violation flag based on the comparison (step 710); if the threshold value is exceeded, then the flag is set, and if not, then it is cleared. In a similar fashion, the emergency thread compares the computed processing-lapse time period with the processing-lapse-time-period threshold value and sets or clears a processing-lapse violation flag based on the comparison (step 712); if the threshold value is exceeded, then the flag is set, and if not, then it is cleared.

Referring now to FIG. 7B, an impaired workflow condition flag is cleared (step 714), and the emergency thread examines the workflow-condition-evaluation indication parameter, e.g., shown as parameter 510 in FIG. 5, to determine whether the pending-request violation flag and/or the processing-lapse violation flag should determine whether or not an impaired workflow condition exists (step 716). If the workflow-condition-evaluation indication parameter indicates that only the number of pending requests should guide the determination of an impaired workflow condition (step 718), then a determination is made as to whether or not the pending-request violation flag was previously set at step 710 (step 720). If not, then an impaired workflow condition is not present, and the process is concluded. If the pending-request violation flag is set, then the impaired workflow condition flag is set (step 722), e.g., for use at step 614 in FIG. 6, and the process is concluded.

If the workflow-condition-evaluation indication parameter indicates that only the processing-lapse time period should guide the determination of an impaired workflow condition (step 724), then a determination is made as to whether or not the processing-lapse violation flag was previously set at step 712 (step 726). If not, then an impaired workflow condition is not present, and the process is concluded. If the processing-lapse violation flag is set, then the impaired workflow condition flag is set (step 728), and the process is concluded.

If the workflow-condition-evaluation indication parameter indicates that either the number of pending requests or the processing-lapse time period should guide the determination of an impaired workflow condition (step 730), then a determination is made as to whether or not either the pending-request violation flag or the processing-lapse violation flag was previously set at step 712 or step 714, respectively (step 732). If not, then an impaired workflow condition is not present, and the process is concluded. If either the pending-request violation flag or the processing-lapse violation flag is set, then the impaired workflow condition flag is set (step 734), and the process is concluded.

If the workflow-condition-evaluation indication parameter indicates that both the number of pending requests and the processing-lapse time period should guide the determination of an impaired workflow condition (step 736), then a determination is made as to whether or not both the pending-request violation flag and the processing-lapse violation flag were previously set at step 712 and step 714, respectively (step 738). If not, then an impaired workflow condition is not present, and the process is concluded. However, if both the pending-request violation flag and the processing-lapse violation flag are set, then the impaired workflow condition flag is set (step 740), and the process is concluded.

Figure 8:
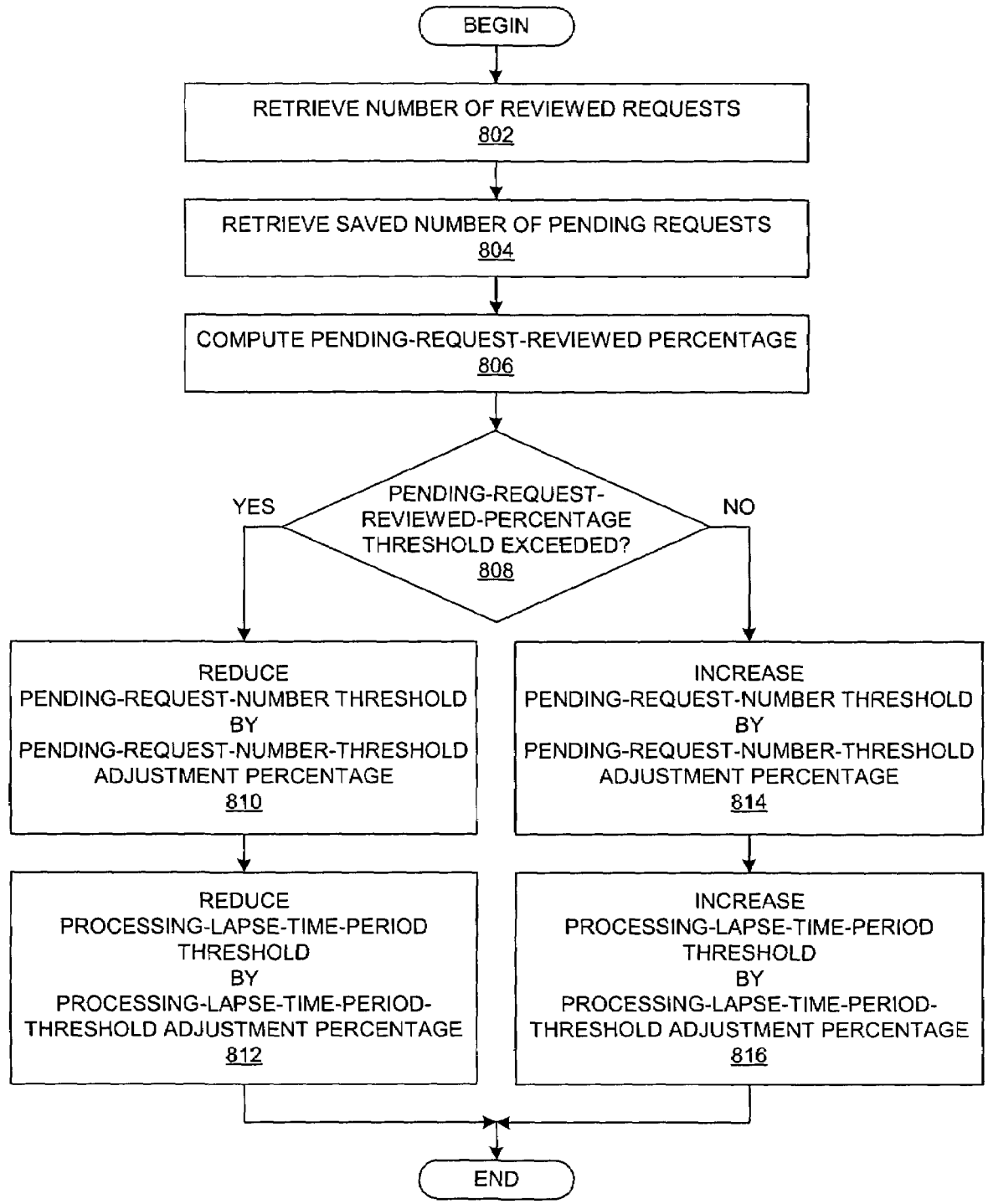
FIG. 8 depicts a flowchart that illustrates a process for adjusting the workflow condition evaluation parameters.

With reference now to FIG. 8, a flowchart depicts a process for adjusting the workflow condition evaluation parameters. The process that is shown within FIG. 8 provides additional detail for step 632 in FIG. 6. The process results in a change to the workflow condition evaluation parameters before the emergency thread goes into a sleep state; the adjusted parameters subsequently affect under what conditions the emergency thread will determine that an impaired workflow condition is present.

The process commences when the emergency thread retrieves a count value for the number of reviewed requests (step 802), e.g., as set at step 618 in FIG. 6. The emergency thread also retrieves the saved number of pending requests (step 804), e.g., as saved at step 604 in FIG. 6. Using the two retrieved values, the emergency thread computes a pending-request-reviewed percentage value (step 806). The pending-request-reviewed percentage value is then compared with the pending-request-reviewed-percentage threshold value (step 808).

If the pending-request-reviewed-percentage threshold value has been exceeded, then the emergency thread was able to review a relatively large number of pending requests during the emergency thread's current execution period, and the emergency thread needs to evaluate workflow conditions more often than the parameters currently allow. In other words, the parameters that are restricting the execution of the emergency thread need to be relaxed. Hence, the emergency thread reduces the pending-request-number threshold by the pending-request-number-threshold adjustment percentage value without violating a floor value (step 810), e.g., as configured by processing restriction adjustment parameters 526 that are shown in FIG. 5. In addition, the emergency thread reduces the processing-lapse-time-period threshold by the processing-lapse-time-period-threshold adjustment percentage without violating a floor value (step 812), and the process is concluded.

If the pending-request-reviewed-percentage threshold value has not been exceeded at step 808, then the emergency thread was only able to review a relatively small number of pending requests during the emergency thread's current execution period, and the emergency thread needs to evaluate workflow conditions less often than the parameters currently allow. In other words, the parameters that are restricting the execution of the emergency thread need to be more restrictive. Hence, the emergency thread increases the pending-request-number threshold by the pending-request-number-threshold adjustment percentage value without violating a ceiling value (step 814), e.g., as configured by processing restriction adjustment parameters 526 that are shown in FIG. 5. In addition, the emergency thread increases the processing-lapse-time-period threshold by the processing-lapse-time-period-threshold adjustment percentage without violating a ceiling value (step 816), and the process is concluded.

The advantages of the present invention should be apparent with respect to the description of the invention that has been provided above. An emergency thread runs in the same process space as a set of worker threads, but the emergency thread may be scheduled to sleep for a configurable period of time. When the emergency thread awakes, the emergency thread determines if an impaired workflow condition exists. If so, then the emergency thread attempts to alleviate or to resolve the impaired workflow condition. The emergency thread looks for pending requests that it can or should process, which hopefully alleviates or resolves the impaired workflow condition. After each request that it processes, the emergency thread reevaluates the workflow conditions to see if it should continue to run. If the workflow conditions have improved, then the emergency thread can return to a sleep state.

The examples herein illustrate the present invention through the use of multiple threads within a multithreaded application. It should be noted, however, that the present invention is also applicable to a multiprocessing or multiprogramming environment in which a process, task, or program is analogous to a thread; the shared data structures would be contained within some type of shared memory that is accessible to each of the multiple processes. In that type of implementation, an emergency process is able to alleviate or resolve an impaired workflow condition among multiple processes.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing data in a multithreaded application in a data processing system, the method comprising:
    placing work items into a data structure that is maintained in the data processing system, wherein the work items are pending processing by the multithreaded application;
    processing work items from the data structure by a plurality of threads within the multithreaded application in accordance with a first algorithm;
    processing work items from the data structure by a thread within the multithreaded application in accordance with a second algorithm that differs from the first algorithm, wherein the thread is configured distinctly from the plurality of threads; and
    restricting the processing of work items by the thread in accordance with a second set of parameters used to evaluate workflow conditions, wherein the step of restricting the processing of work items by the thread in accordance with a second set of parameters further comprises:
        evaluating workflow conditions of the plurality of threads for a characteristic of a workflow condition as controlled by the second set of parameters;
        in response to a determination of whether or not the workflow conditions of the plurality of threads has a characteristic indicated by the second set of parameters, processing or not processing work items by the thread, respectively;
        reevaluating workflow conditions of the plurality of threads for a characteristic of a workflow condition as controlled by the second set of parameters in response to processing a work item by the thread:
        in response to a determination of whether or not the workflow conditions of the plurality of threads has a characteristic indicated by the second set of parameters, processing or not processing work items by the thread, respectively; and
        adjusting one or more parameters in the second set of parameters in accordance with a third set of parameters used to regulate a time period associated with processing the work items by the thread in response to a determination that workflow conditions do not have a characteristic indicated by the second set of parameters.

2. The method of claim 1 wherein the step of adjusting one or more parameters in the second set of parameters in accordance with a third set of parameters further comprises:
    comparing a number of work items in the data structure that have been examined by the thread with a threshold value indicated by a parameter in the third set of parameters; and
    determining whether or not to adjust one or more parameters in the second set of parameters based on an outcome of the comparison of the number of work items examined by the thread with the indicated threshold value.

3. A method for processing data in a multithreaded application in a data processing system, the method comprising:

placing work items into a data structure that is maintained in the data processing system, wherein the work items are pending processing by the multithreaded application;

processing work items from the data structure by a plurality of threads within the multithreaded application in accordance with a first algorithm;

processing work items from the data structure by a thread within the multithreaded application in accordance with a second algorithm that differs from the first algorithm, wherein the thread is configured distinctly from the plurality of threads; and restricting the processing of work items by the thread in accordance with a second set of parameters used to evaluate workflow conditions, wherein the step of restricting the processing of work items by the thread in accordance with a second set of parameters further comprises:

evaluating workflow conditions of the plurality of threads for a characteristic of a workflow condition as controlled by the second set of parameters; and in response to a determination of whether or not the workflow conditions of the plurality of threads has a characteristic indicated by the second set of parameters, processing or not processing work items by the thread, respectively;

selecting one or more characteristics of the workflow conditions to be evaluated as indicated by a parameter in the second set of parameters;

indicating, by the parameter, one or more characteristics from the group consisting of: a number of work items in the data structure; a time period since a work item in the data structure has been processed by the plurality of threads; the number of work items and the time period; or the number of work items or the time period.

* * * * *